(12) United States Patent
Yamada

(10) Patent No.: US 11,053,880 B1
(45) Date of Patent: Jul. 6, 2021

(54) ABNORMALITY DIAGNOSIS SYSTEM FOR AIR FLOW METER

(71) Applicant: TOYOTA JIDOSHA KABUSHIKI KAISHA, Toyota (JP)

(72) Inventor: Kazuhiro Yamada, Toyota (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 0 days.

(21) Appl. No.: 16/949,101

(22) Filed: Oct. 14, 2020

(30) Foreign Application Priority Data

Jan. 7, 2020 (JP) .............................. JP2020-000803

(51) Int. Cl.
| | |
|---|---|
| *F02D 41/18* | (2006.01) |
| *F02D 41/22* | (2006.01) |
| *F02D 41/24* | (2006.01) |
| *F02D 13/02* | (2006.01) |
| *F02D 41/14* | (2006.01) |

(52) U.S. Cl.
CPC ....... *F02D 41/222* (2013.01); *F02D 13/0215* (2013.01); *F02D 41/1405* (2013.01); *F02D 41/18* (2013.01); *F02D 41/2441* (2013.01); *F02D 2200/0404* (2013.01); *F02D 2200/101* (2013.01)

(58) Field of Classification Search
CPC ..... F02D 41/18; F02D 41/222; F02D 41/1405
See application file for complete search history.

(56) References Cited

U.S. PATENT DOCUMENTS

| | | | | |
|---|---|---|---|---|
| 4,546,647 A | * | 10/1985 | Takahashi | ............... F02D 41/18 |
| | | | | 73/114.32 |
| 4,599,696 A | * | 7/1986 | Takahashi | ............... F02D 41/18 |
| | | | | 123/479 |
| 4,875,456 A | * | 10/1989 | Tomisawa | ............. F02D 31/005 |
| | | | | 123/585 |
| 5,560,199 A | * | 10/1996 | Agustin | .................... F01N 3/22 |
| | | | | 60/274 |
| 5,964,811 A | * | 10/1999 | Ishii | ...................... F02D 41/266 |
| | | | | 701/29.2 |
| 6,457,353 B1 | * | 10/2002 | Kanke | ...................... F01L 9/20 |
| | | | | 73/114.42 |

(Continued)

FOREIGN PATENT DOCUMENTS

JP 2010-048133 A 3/2010

*Primary Examiner* — Thomas N Moulis
(74) *Attorney, Agent, or Firm* — Oblon, McClelland, Maier & Neustadt, L.L.P.

(57) ABSTRACT

A storage device of a control system stores a trained neural network that is trained by using training data to which information as to whether there is an abnormality in an air flow meter is given as a true label. The trained neural network receives, as inputs, condition index values including the opening of a throttle valve and the engine speed, a load detected value calculated based on a detection signal of the air flow meter, a load estimated value estimated without using the detection signal of the air flow meter, and a change index value indicating the degree of change of the engine load. A CPU of the control system executes a diagnostic process to determine whether there is an abnormality in the air flow meter, using the neural network, which receives the condition index values, load detected value, load estimated value, and change index value as the inputs.

9 Claims, 5 Drawing Sheets

(56) References Cited

U.S. PATENT DOCUMENTS

| | | | | |
|---|---|---|---|---|
| 6,493,627 | B1* | 12/2002 | Gallagher | F02D 41/38 |
| | | | | 123/480 |
| 6,681,742 | B1* | 1/2004 | Hirayama | F02D 11/107 |
| | | | | 123/399 |
| 6,729,297 | B2* | 5/2004 | Futonagane | F02D 41/403 |
| | | | | 123/299 |
| 8,146,562 | B2* | 4/2012 | Yezerets | F01N 3/36 |
| | | | | 123/198 D |
| 10,260,446 | B2* | 4/2019 | Ottikkutti | F02D 41/3845 |
| 10,316,783 | B2* | 6/2019 | Klingbeil | F02D 41/401 |
| 10,480,474 | B2* | 11/2019 | Chandrakar | F02M 65/006 |
| 10,519,887 | B1* | 12/2019 | Thompson | F02M 35/10386 |
| 10,533,514 | B2* | 1/2020 | Garimella | F02D 35/023 |
| 10,648,423 | B2* | 5/2020 | Doring | F02D 35/027 |
| 10,794,315 | B2* | 10/2020 | Leblon | F02D 41/221 |
| 2004/0103880 | A1* | 6/2004 | Hirayama | G01F 15/046 |
| | | | | 123/350 |
| 2007/0208486 | A1* | 9/2007 | Yasui | F01L 13/0021 |
| | | | | 701/101 |
| 2007/0225892 | A1* | 9/2007 | Yasui | F02D 13/023 |
| | | | | 701/104 |
| 2010/0318282 | A1* | 12/2010 | Ogiso | F02D 41/1456 |
| | | | | 701/109 |
| 2014/0074379 | A1* | 3/2014 | Aoyagi | F02D 41/0072 |
| | | | | 701/104 |
| 2015/0039209 | A1* | 2/2015 | Yui | F02D 41/0002 |
| | | | | 701/104 |
| 2015/0122234 | A1* | 5/2015 | Tanaka | F02B 37/12 |
| | | | | 123/564 |
| 2016/0290255 | A1* | 10/2016 | Miyahara | F02D 41/222 |
| 2019/0234334 | A1* | 8/2019 | Tamakoshi | F02D 45/00 |
| 2019/0277180 | A1* | 9/2019 | Dudar | F01N 9/002 |
| 2019/0277229 | A1* | 9/2019 | Mizutani | F02M 35/10091 |

* cited by examiner

ABNORMALITY DIAGNOSIS SYSTEM FOR AIR FLOW METER

INCORPORATION BY REFERENCE

The disclosure of Japanese Patent Application No. 2020-000803 filed on Jan. 7, 2020 including the specification, drawings and abstract is incorporated herein by reference in its entirety.

BACKGROUND

1. Technical Field

The present disclosure relates to an abnormality diagnosis system for an air flow meter.

2. Description of Related Art

An abnormality diagnosis system for an air flow meter is disclosed in Japanese Unexamined Patent Application Publication No. 2010-48133 (JP 2010-48133 A). When the operating state of a vehicle-mounted engine satisfies a particular abnormality detection condition, and a relatively stable detection signal can be obtained from an air flow meter, the abnormality diagnosis system compares the intake air amount calculated based on the detection signal of the air flow meter, with an allowable range calculated according to the operating state of the engine. Then, the abnormality diagnosis system determines that there is an abnormality in the air flow meter, when the intake air amount calculated based on the detection signal of the air flow meter deviates from the allowable range.

SUMMARY

The abnormality diagnosis system as described above can make a diagnosis on an abnormality of the air flow meter, only when the operating state of the engine satisfies the particular abnormality detection condition, and a relative stable detection signal can be obtained. Thus, chances of abnormality diagnosis are small.

To solve the above problem, one aspect of the present disclosure provides an abnormality diagnosis system that makes a diagnosis of an abnormality in an air flow meter provided in an intake passage of a vehicle-mounted engine having a throttle valve. The abnormality diagnosis system includes a storage device configured to store a trained neural network that is trained by using training data to which information as to whether there is an abnormality in the air flow meter is given as a true label. The trained neural network receives, as inputs, condition index values indicating conditions of the vehicle-mounted engine including an opening of the throttle valve and an engine speed as a rotational speed of an output shaft of the vehicle-mounted engine, a load detected value as an index value of an engine load calculated based on a detection signal of the air flow meter, a load estimated value as an index value of the engine load estimated based on the condition index values without using the detection signal of the air flow meter, and a change index value indicating a degree of change of the engine load. The abnormality diagnosis system further includes an execution device configured to execute a diagnostic process to determine whether there is an abnormality in the air flow meter, using the trained neural network, which receives the condition index values, the load detected value, the load estimated value, and the change index value, as the inputs.

When an abnormality occurs in the air flow meter, the load detected value deviates from the load estimated value. Thus, data including the load detected value and the load estimated value are effective as inputs for diagnosis as to whether there is an abnormality in the air flow meter. Also, the system configured as described above inputs the condition index values, in addition to the load detected value and the load estimated value. The condition index values provide information indicating conditions of the engine when the load detected value and load estimated value are calculated. Accordingly, the condition index values serve to verify the reliability of the load detected value and the load estimated value. The system configured as described above can make a diagnosis in view of the conditions of the engine obtained when the load detected value and the load estimated value are calculated. However, the degree of deviation between the load detected value and the load estimated value is different between the period of steady operation where the engine load is stable, and the period of transient operation where the engine load changes largely. Thus, the system further inputs the change index value indicating the degree of change of the engine load. In this manner, the system can make a diagnosis in view of an influence due to the degree of change of the engine load.

Namely, the system configured as described above can conduct abnormality diagnosis of the air flow meter, without limiting the chances of execution, to those under a condition that the air flow meter outputs a stable detection signal. In the abnormality diagnosis system as described above, the vehicle-mounted engine may include an intake-side variable valve timing device that changes an opening-closing timing of an intake valve relative to a rotational phase of the output shaft, and the condition index values may include an operation amount of the intake-side variable valve timing device.

The opening-closing timing of the intake valve is an element that has an influence on the operating state of the engine. Thus, when the air flow meter to be diagnosed is mounted in the engine having the intake-side variable valve timing device, it is preferable that the condition index values include the operation amount of the intake-side variable valve timing device, as in the above system. With the operation amount of the intake-side variable valve timing device thus included in the condition index values, the system can make a more accurate diagnosis in view of the influence of the opening-closing timing of the intake valve.

In the abnormality diagnosis system as described above, the vehicle-mounted engine may include an exhaust-side variable valve timing device that changes an opening-closing timing of an exhaust valve relative to a rotational phase of the output shaft, and the condition index values may include an operation amount of the exhaust-side variable valve timing device.

The opening-closing timing of the exhaust valve is an element that has an influence on the operating state of the engine. Thus, when the air flow meter to be diagnosed is mounted in the engine having the exhaust-side variable valve timing device, it is preferable that the condition index values include the operation amount of the exhaust-side variable valve timing device, as in the above system. With the operation amount of the exhaust-side variable valve timing device thus included in the condition index values, the system can make a more accurate diagnosis in view of the influence of the opening-closing timing of the exhaust valve.

In the abnormality diagnosis system as described above, the vehicle-mounted engine may include a supercharger, and the condition index values may include a supercharging pressure. The supercharging pressure is an element that has an influence on the operating state of the engine. Thus, when the air flow meter to be diagnosed is mounted in the engine having the supercharger, it is preferable that the condition index values include the supercharging pressure, as in the above system. With the supercharging pressure thus included in the condition index values, the system can make a more accurate diagnosis in view of the influence of the supercharging pressure.

In the abnormality diagnosis system as described above, the vehicle-mounted engine may include an exhaust recirculation passage that connects an exhaust passage with the intake passage, and a regulating valve provided in the exhaust recirculation passage and configured to regulate an amount of exhaust gas recirculated into the intake passage, and the condition index values may include an index value indicating an opening of the regulating valve.

In the case where the engine includes the exhaust recirculation passage that connects the exhaust passage with the intake passage, and the regulating valve, and recirculates exhaust gas into the intake passage, the amount of the exhaust gas thus recirculated is an element that has an influence on the operating state of the engine. Thus, when the air flow meter to be diagnosed is mounted in the engine having the regulating valve that regulates the amount of exhaust gas recirculated into the intake passage, it is preferable that the condition index values include the index value indicating the opening of the regulating valve, as in the above system. With the index value indicating the opening of the regulating valve thus included in the condition index values, the system can make a more accurate diagnosis in view of the influence of the exhaust gas recirculated into the intake passage.

In the abnormality diagnosis system as described above, the change index value may be an amount of change of the load estimated value per unit time. In the abnormality diagnosis system as described above, when the execution device determines a predetermined number of times, in the diagnostic process, that there is an abnormality in the air flow meter, during one trip, the execution device may confirm a diagnostic result indicating the presence of the abnormality in the air flow meter, and may store information indicating that the diagnostic result is confirmed, in the storage device.

Since the diagnostic result is confirmed more carefully, the system configured as described above can make a diagnosis with higher accuracy, as compared with the case where the diagnostic result indicating the presence of an abnormality is confirmed based on the result of a single diagnosis. Then, it is possible to leave information used for confirming whether there is an abnormality. Consequently, it is possible to cope with the abnormality, through repair, for example, by confirming the information stored in the storage device.

In the abnormality diagnosis system as described above, when the execution device determines a predetermined number of times, in the diagnostic process, that there is no abnormality in the air flow meter, before a diagnostic result indicating the presence of an abnormality is confirmed, during one trip, the execution device may confirm a diagnostic result indicating that the air flow meter is normal, and may finish the diagnostic process in the trip.

With the above configuration, the diagnostic process is prevented from continuing to be repeated, even though the air flow meter is normal. Also, the diagnosis of normality is confirmed, under a condition that the diagnosis of normality has been made a plurality of times. Thus, the diagnosis of normality is confirmed more carefully, as compared with the case where the diagnosis of normality is confirmed based on the result of a single diagnosis. Accordingly, the system can make a more accurate diagnosis.

In the abnormality diagnosis system as described above, when the information indicating that the diagnostic result indicating the presence of the abnormality in the air flow meter is confirmed is stored in the storage device, the execution device may execute reporting operation to report the presence of the abnormality in the air flow meter.

With the above configuration, the presence of the abnormality is reported, so as to promote repair.

BRIEF DESCRIPTION OF THE DRAWINGS

Features, advantages, and technical and industrial significance of exemplary embodiments of the present disclosure will be described below with reference to the accompanying drawings, in which like signs denote like elements, and wherein.

DETAILED DESCRIPTION OF EMBODIMENTS

Figure 1:
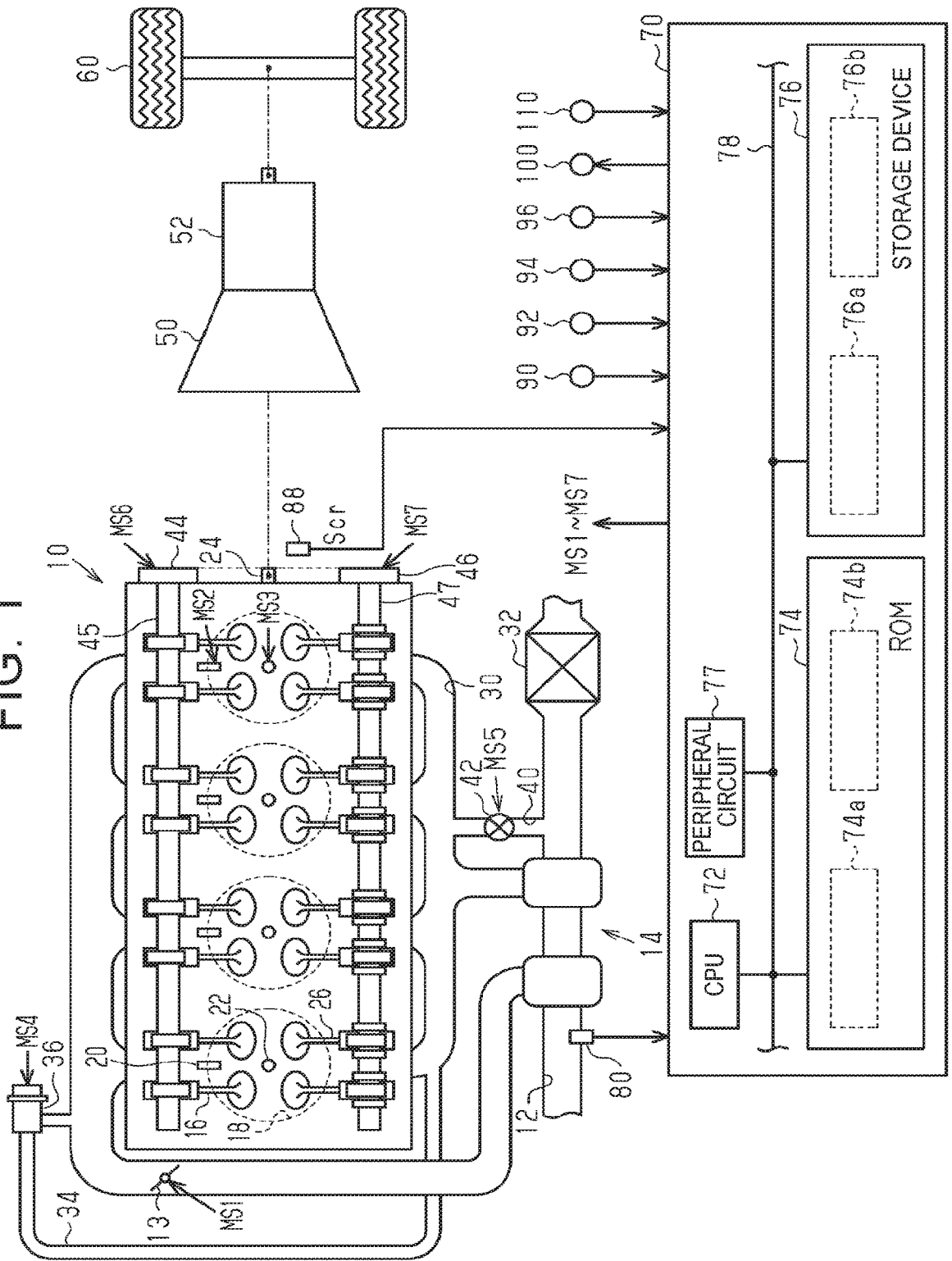
FIG. 1 is a schematic view showing the configuration of a control system according to one embodiment and a drive system of a vehicle.

An abnormality diagnosis system for detecting an abnormality in an air flow meter according to one embodiment will be described with reference to FIG. 1 to FIG. 7. In an engine 10 installed on a vehicle shown in FIG. 1, a throttle valve 13 is provided in an intake passage 12. Air introduced through the intake passage 12 flows downstream via a supercharger 14, and flows into combustion chambers 18 when intake valves 16 are opened. In the engine 10, fuel injection valves 20 that directly inject fuel into the combustion chambers 18, and ignition devices 22 that generate spark discharge are provided. In the combustion chambers 18, a mixture of air and fuel is subjected to combustion, and energy generated through combustion is taken out as rotational energy of a crankshaft 24 as an output shaft of the engine 10. The mixture subjected to combustion is discharged, as exhaust gas, into an exhaust passage 30 when exhaust valves 26 are opened. A three-way catalyst 32 having oxygen storage capacity is provided in the exhaust passage 30. The exhaust passage 30 communicates with the intake passage 12 via an EGR passage 34. Namely, the EGR passage 34 is an exhaust gas recirculation passage that connects the exhaust passage 30 with the intake passage 12 so as to allow exhaust gas to be recirculated into the intake passage 12. The EGR passage 34 is provided with an EGR valve 36 that adjusts its channel cross-sectional area. The EGR valve 36 is a regulating valve that is driven by a stepping motor, to adjust the channel cross-sectional area of the EGR passage 34 and regulate the amount of exhaust gas recirculated into the intake passage 12.

The rotary power of the crankshaft 24 is transmitted to an intake camshaft 45 via an intake-side variable valve timing device 44, and is transmitted to an exhaust camshaft 47 via an exhaust-side variable valve timing device 46. The intake-side variable valve timing device 44 changes a difference in the rotational phase between the intake camshaft 45 and the crankshaft 24, and the exhaust-side variable valve timing device 46 changes a difference in the rotational phase between the exhaust camshaft 47 and the crankshaft 24. Namely, the intake-side variable valve timing device 44 is operable to change the opening-closing timing of the intake valves 16 relative to the rotational phase of the crankshaft 24. Also, the exhaust-side variable valve timing device 46 is operable to change the opening-closing timing of the exhaust valves 26 relative to the rotational phase of the crankshaft 24.

The exhaust passage 30 includes a bypass passage 40 through which exhaust gas flows toward the three-way catalyst 32 while bypassing the supercharger 14. The bypass passage 40 is provided with a waste gate valve 42 that adjusts its channel cross-sectional area. Drive wheels 60 are mechanically connected to the crankshaft 24, via a torque converter 50 and a transmission 52.

A control system 70 performs control on the engine 10, and operates operating parts of the engine 10, which include the throttle valve 13, fuel injection valves 20, ignition devices 22, EGR valve 36, waste gate valve 42, intake-side variable valve timing device 44, and exhaust-side variable valve timing device 46, so as to control the torque, proportion of exhaust components, etc. as controlled variables of the engine 10. In FIG. 1, respective operation signals MS1 to MS7 of the throttle valve 13, fuel injection valve 20, ignition device 22, EGR valve 36, waste gate valve 42, intake-side variable valve timing device 44, and exhaust-side variable valve timing device 46 are indicated.

In controlling the controlled variables, the control system 70 refers to the intake air amount GA detected by the air flow meter 80. The control system 70 also refers to an output signal Scr of a crank angle sensor 88, vehicle speed SPD detected by a vehicle speed sensor 90, outside air temperature TO detected by an outside air temperature sensor 92, atmospheric pressure PO detected by an atmospheric pressure sensor 94, supercharging pressure Pi detected by an intake pressure sensor 96, and so forth. Also, a main switch 110 of the vehicle is connected to the control system 70.

The control system 70 includes a central processing unit (CPU) 72, random access memory (ROM) 74, storage device 76 as an electrically rewritable non-volatile memory, and peripheral circuits 77, which can communicate with each other via a local network 78. The peripheral circuits 77 include a circuit that generates a clock signal regulating internal operation, power supply circuit, reset circuit, and so forth.

In the control system 70, the CPU 72 executes programs stored in the ROM 74, so as to control the controlled variables. Namely, in the control system 70, the CPU 72 and the ROM 74 provide the execution device.

The control system 70 calculates the engine speed NE as the number of revolutions of the crankshaft 24 per unit time, based on the output signal Scr of the crank angle sensor 88. Also, the control system 70 calculates the engine load ratio KL as an index value of the engine load, based on the engine speed NE and the intake air amount GA. The engine load ratio KL is the ratio of the current cylinder inflow air amount, to the cylinder inflow air amount at the time when the engine 10 is in steady operation in a condition where the throttle valve 13 is fully opened at the current engine speed NE. The current cylinder inflow air amount is the amount of intake air flowing into each cylinder on the intake stroke, and can be calculated based on the intake air amount GA. Also, the cylinder inflow air amount at the time when the engine 10 is in steady operation in the condition where the throttle valve 13 is fully opened at the current engine speed NE is the maximum cylinder inflow air amount at the current engine speed NE, and can be calculated based on the engine speed NE. Accordingly, the engine load ratio KL can be calculated based on the engine speed NE and the intake air amount GA.

The control system 70 controls the intake-side variable valve timing device 44, exhaust-side variable valve timing device 46, and EGR valve 36, based on the engine load ratio KL and the engine speed NE. In the storage device 76, map data 76b for use in calculation of target controlled variables, based on the engine load ratio KL and the engine speed NE, are stored. More specifically, the control system 70 computes a target advance amount INvt, based on the engine load ratio KL and the engine speed NE, using map data for calculating the advance amount INvt of the valve timing of the intake valves 16 as an amount of operation by the intake-side variable valve timing device 44. Then, the control system 70 operates the intake-side variable valve timing device 44 so as to achieve the advance amount INvt thus calculated. Similarly, the control system 70 computes a retard amount EXvt of the valve timing of the exhaust valves 26, based on the engine load ratio KL and the engine speed NE, using the map data 76b stored in the storage device 76. Then, the control system 70 operates the exhaust-side variable valve timing device 46, so as to achieve the retard amount EXvt thus calculated. Also, the control system 70 computes the number of operation steps Segr of the EGR valve 36 based on the engine load ratio KL and the engine speed NE, using the map data 76b stored in the storage device 76. Then, the control system 70 operates the stepping motor that drives the EGR valve 36, so as to achieve the calculated number of operation steps Segr.

The map data are datasets of discrete values of an input variable, and values of an output variable corresponding to the respective values of the input variable. In map computation, when a value of an input variable coincides with any of the values of the input variable in the map data, a corresponding value of the output variable in the map data provides a computation result. On the other hand, when the value of the input variable does not coincide any of the values in the map data, the computation result may be provided by a value obtained by interpolating two or more values of the output variable included in the map data.

As described above, the engine load ratio KL is calculated based on the intake air amount GA detected by the air flow meter 80. Therefore, if an abnormality occurs in the air flow meter 80, and it becomes impossible to detect the intake air amount GA correctly, the intake-side variable valve timing device 44, exhaust-side variable valve timing device 46, and EGR valve 36 cannot be appropriately controlled.

In order to conduct an abnormality diagnosis to determine whether the air flow meter 80 can normally detect the intake air amount GA, the control system 70 calculates the engine load ratio KL by a method that does not use the intake air amount GA detected by the air flow meter 80, as an object to be compared. More specifically, the control system 70 estimates the engine load ratio KL, based on four index values of the throttle opening TA as the opening of the throttle valve 13, engine speed NE, atmospheric pressure PO, and outside air temperature TO. In the following description, the engine load ratio KL calculated based on the intake air amount GA detected by the air flow meter 80 will be referred to as "load detected value KLdtc", and the engine load ratio KL estimated without using the detected intake air amount GA will be referred to as "load estimated value KLest".

Figure 2:
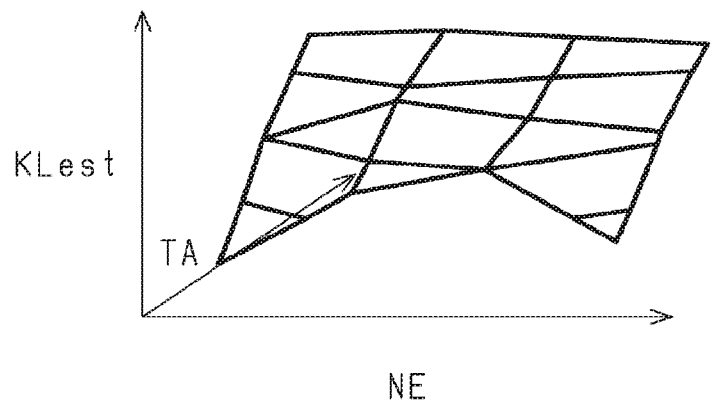
FIG. 2 is a map indicating the relationship of the engine speed, throttle opening, and load estimated value prior to correction.

The load estimated value KLest is calculated in the manner as follows. Initially, the control system 70 calculates a pre-correction value of the load estimated value KLest through map computation, based on the engine speed NE and the throttle opening TA. The map data used at this time is data that associates a combination of the engine speed NE and the throttle opening TA with a value of the load estimated value KLest, as shown in FIG. 2, and is stored as map data 76*b* in the storage device 76.

The control system 70 performs atmospheric pressure correction using the atmospheric pressure PO, and intake air temperature correction using the outside air temperature TO, on the load estimated value KLest thus calculated, thereby to calculate a final load estimated value KLest.

Figure 3:
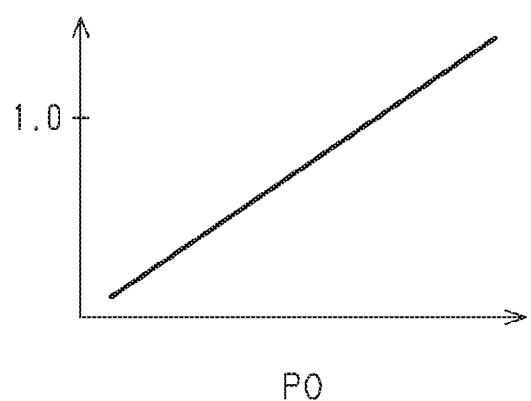
FIG. 3 is a map indicating the relationship between the atmospheric pressure and a correction factor of the load estimated value.

In the atmospheric pressure correction, the load estimated value KLest is multiplied by a correction factor that is larger as the atmospheric pressure PO is higher, as shown in FIG. 3, so that the load estimated value KLest is corrected to a larger value as the atmospheric pressure PO is higher. The calculation of the correction factor according to the atmospheric pressure PO is also performed using the map data 76*b* stored in the storage device 76. In the map data shown in FIG. 2, a state where the atmospheric pressure PO is a standard atmospheric pressure, and the outside air temperature is 25° C. is specified as a standard state. Thus, in the map data used when calculating the correction factor according to the atmospheric pressure PO, "1.0" is calculated as the correction factor when the atmospheric pressure PO is the standard atmospheric pressure, as shown in FIG. 3. Then, in the map data shown in FIG. 3, the correction factor increases as the atmospheric pressure PO becomes higher than the standard atmospheric pressure, and the correction factor is reduced and approaches "0" as the atmospheric pressure PO becomes lower than the standard atmospheric pressure.

Figure 4:
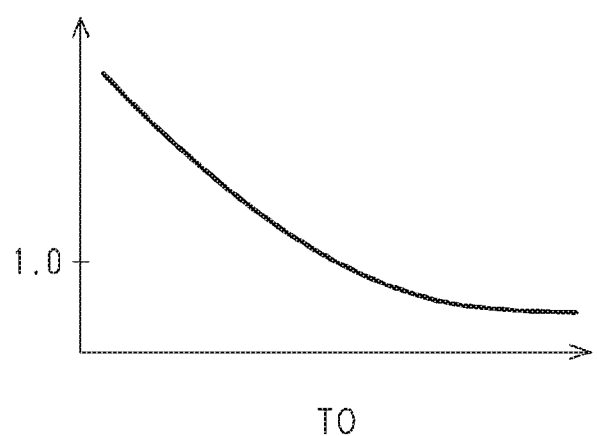
FIG. 4 is a map indicating the relationship between the intake air temperature and a correction factor of the load estimated value.

In the intake air temperature correction, the load estimated value KLest is multiplied by a correction factor that is smaller as the outside air temperature TO is higher, as shown in FIG. 4, so that the load estimated value KLest is corrected to a smaller value as the outside air temperature TO is higher. The calculation of the correction factor according to the outside air temperature TO is also performed using the map data 76*b* stored in the storage device 76. In the map data used when calculating the correction factor according to the outside air temperature TO, "1.0" is calculated as the correction factor when the outside air temperature TO is 25° C., as shown in FIG. 4. Then, in the map data shown in FIG. 4, the correction factor increases as the outside air temperature TO becomes lower than 25° C., and the correction factor is reduced and approaches "0" as the outside air temperature TO becomes higher than 25° C.

The post-correction load estimated value KLest thus calculated is compared with the load detected value KLdtc, and it may be considered as a result of diagnosis that there is an abnormality in the air flow meter 80 when a deviation of the load estimated value from the load detected value is large. However, the degree of deviation between the load detected value KLdtc and the load estimated value KLest differs between a period of steady operation where the engine load ratio KL is stable, and a period of transient operation where the engine load ratio KL changes largely.

Thus, in the case where the load estimated value KLest and the load detected value KLdtc are simply compared with each other, and a diagnosis of the presence of an abnormality in the air flow meter 80 is to be made when the deviation is large, it is necessary to set conditions for execution of diagnosis, and standardize operating conditions of the engine for execution of the diagnosis, to some extent. In this case, chances of execution of the diagnosis will be reduced.

Thus, the control system 70 determines, using a neural network, whether there is an abnormality in the air flow meter 80. Namely, the control system 70 serves as a control system of the engine 10, and also serves as an abnormality diagnosis system for detecting an abnormality in the air flow meter 80.

Figure 5:
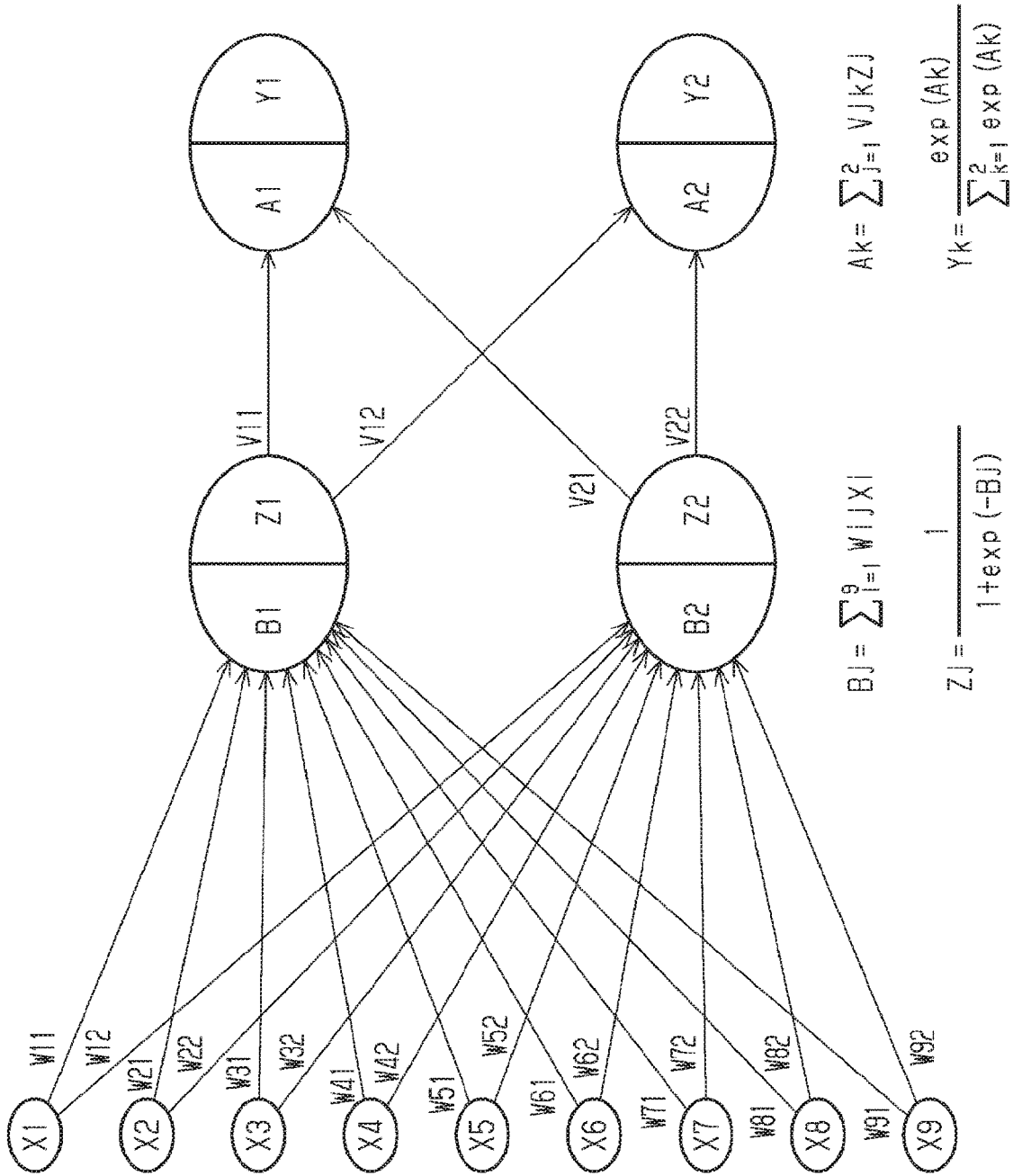
FIG. 5 is a view showing a neural network used in a diagnostic process.

Referring next to FIG. 5, the neural network used for an abnormality diagnosis of the air flow meter 80 will be described. As shown in FIG. 5, the neural network has an input layer that consists of nine nodes, a middle layer that consists of two nodes, and an output layer that consists of two nodes.

The nodes of the input layer receive nine input values of Xi (i=1 to 9). While the neural network shown in FIG. 5 has only one middle layer, the number of middle layers may be set to any desired number equal to or larger than two, and the number of nodes of the middle layer may also be set to any desired number.

In the neural network shown in FIG. 5, the activation function of the middle layer is the sigmoid function. In FIG. 5, input values to the middle layer are denoted as Bj (j=1, 2). Each input value Bj (j=1, 2) to the middle layer is calculated as the sum of values obtained by multiplying each of the input values X1 to X9 to the input layer, by the weight Wij (i=1 to 9, j=1, 2).

Also, in the neural network shown in FIG. 5, output values from the two nodes of the middle layer are denoted as Zj (j=1, 2), respectively. The output layer receives the sums of values obtained by multiplying each of the output values Z1, Z2 by the weight Vjk (j=1, 2, k=1, 2), as input values Ak (k=1, 2). The input values A1, A2 are input to the output layer as a softmax layer, and are converted into corresponding output values Yk (k=1, 2). The sum of the output value Y1 and output value Y2 of the output layer is "1", and each of the output value Y1 and the output value Y2 represents a ratio to "1".

Next, the input values X1 to X9 of the neural network will be described. The input value X1 is the throttle opening TA. The input value X2 is the engine speed NE. The input value X3 is the advance amount INvt of the valve timing of the intake valves 16. The input value X4 is the retard amount EXvt of the valve timing of the exhaust valves 26. The input value X5 is the supercharging pressure Pi. The input value X6 is the number of operation steps Segr of the EGR valve 36. The input values X1 to X6 are condition index values indicating conditions of the engine 10.

The input value X7 is the load detected value KLdtc. The input value X8 is the load estimated value KLest. The input values X7, X8 are index values of the engine load, as described above. Also, the input value X9 is the amount of change of the load estimated value KLest per unit time. More specifically, the input value X9 is a difference ΔKL between the previous calculated value and current calculated value of the load estimated value KLest calculated at regular intervals. Namely, the difference ΔKL is a change index value indicating the degree of change of the engine load ratio KL.

The neural network shown in FIG. 5 uses the input values X1 to X9 as inputs, and outputs the output value Y1 representing the probability that the air flow meter 80 is normal, and the output value Y2 representing the probability that there is an abnormality in the air flow meter 80.

As shown in FIG. 1, the storage device 76 of the control system 70 stores a trained neural network 76a obtained by training the neural network shown in FIG. 5, using training data to which information as to whether there is an abnormality in the air flow meter 80 is given as a true label.

Figure 6:
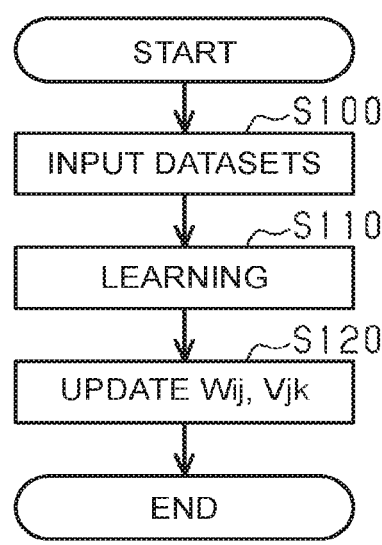
FIG. 6 is a flowchart illustrating the flow of learning.

Next, a method of generating the neural network 76a, namely, learning of the neural network, will be described with reference to FIG. 6. As shown in FIG. 6, when generating the neural network 76a, the control system 70 initially execute step S100 to input datasets into a computer that generates the neural network 76a. The datasets are a collection of training data as combinations of the input values X1 to X9 as described above and true labels Yt1, Yt2.

The true label Yt1 is information indicating that the air flow meter 80 is normal. The true label YU has a value "1" when the air flow meter 80 is normal, and has a value "0" when there is an abnormality in the air flow meter 80. On the other hand, the true label Yt2 is information indicating that there is an abnormality in the air flow meter 80. The true label Yt2 has a value "1" when there is an abnormality in the air flow meter 80, and has a value "0" when the air flow meter 80 is normal. Accordingly, in the training data of the case where the air flow meter 80 is normal, the true label Yt1 is "1", and the true label Yt2 is "0". On the other hand, in the training data of the case where there is an abnormality in the air flow meter 80, the true label Yt1 is "0", and the true label Yt2 is "1".

The datasets are generated by inputting detection values obtained by sensors when the engine 10 is operated in a laboratory, for example, into a computer that generates the datasets. When the engine 10 is operated for generation of the datasets, training data of the case where the air flow meter 80 is normal is obtained by operating the engine 10, using the air flow meter 80 that is normal. In the training data, the true label Yt1 is set to "1", and the true label Yt2 is set to "0".

On the other hand, training data of the case where there is an abnormality in the air flow meter 80 is obtained by operating the engine 10, using the air flow meter 80 in which there is an abnormality. In the training data of this case, the true label Yt1 is set to "0", and the true label Yt2 is set to "1".

The air flow meter 80 that is normal means the air flow meter 80 which provides detection values of the intake air amount GA of which errors are held within the allowable range in terms of operation of the engine 10, and which allows the engine 10 to be operated without requiring repair, for example. On the other hand, the air flow meter 80 in which there is an abnormality means the air flow meter 80 which provides detected values of the intake air amount GA of which errors are outside the allowable range in terms of operation of the engine 10. When the training data of the case where there is an abnormality in the air flow meter 80 are obtained, it is preferable to obtain the training data, using the air flow meters 80 in various conditions corresponding to differences in the degree of abnormality needed to be detected, including not only the ones in which errors of detected values of the intake air amount GA are slightly outside the allowable range, but also the ones in which the errors largely deviate from the allowable range.

Also, since various combinations of the input values X1 to X9 are needed, training data of a wide variety of combinations are obtained, by changing operating conditions of the engine 10 in various manners. When the neural network 76a is generated, datasets consisting of an enormous number of pieces of training data thus obtained are prepared, and, in step S100, the datasets are input into the computer that generates the neural network 76a.

Then, in step S110, learning is performed. The learning mentioned herein is learning of weights in the neural network shown in FIG. 5. In step S110, the training data included in the datasets entered in step S100 are input one by one to the neural network shown in FIG. 5, and the weights Wij, vjk are learned each time one piece of training data is input, using an error backpropagation method, so that errors between the output values Y1, Y2 generated and the true labels Yt1, Yt2 are reduced. Then, learning of the weights is repeated, until the errors between the output values Y1, Y2 and the true labels Yt1, Yt2 are reduced to be smaller than predetermined errors. When the errors become equal to or smaller than the predetermined errors, it is determined that learning is completed, and the next step S120 is executed.

In step S120, the weights Wij, vjk of the neural network shown in FIG. 5 are updated to values obtained when learning is completed, and then recorded, so that the neural network 76a is generated.

Figure 7:
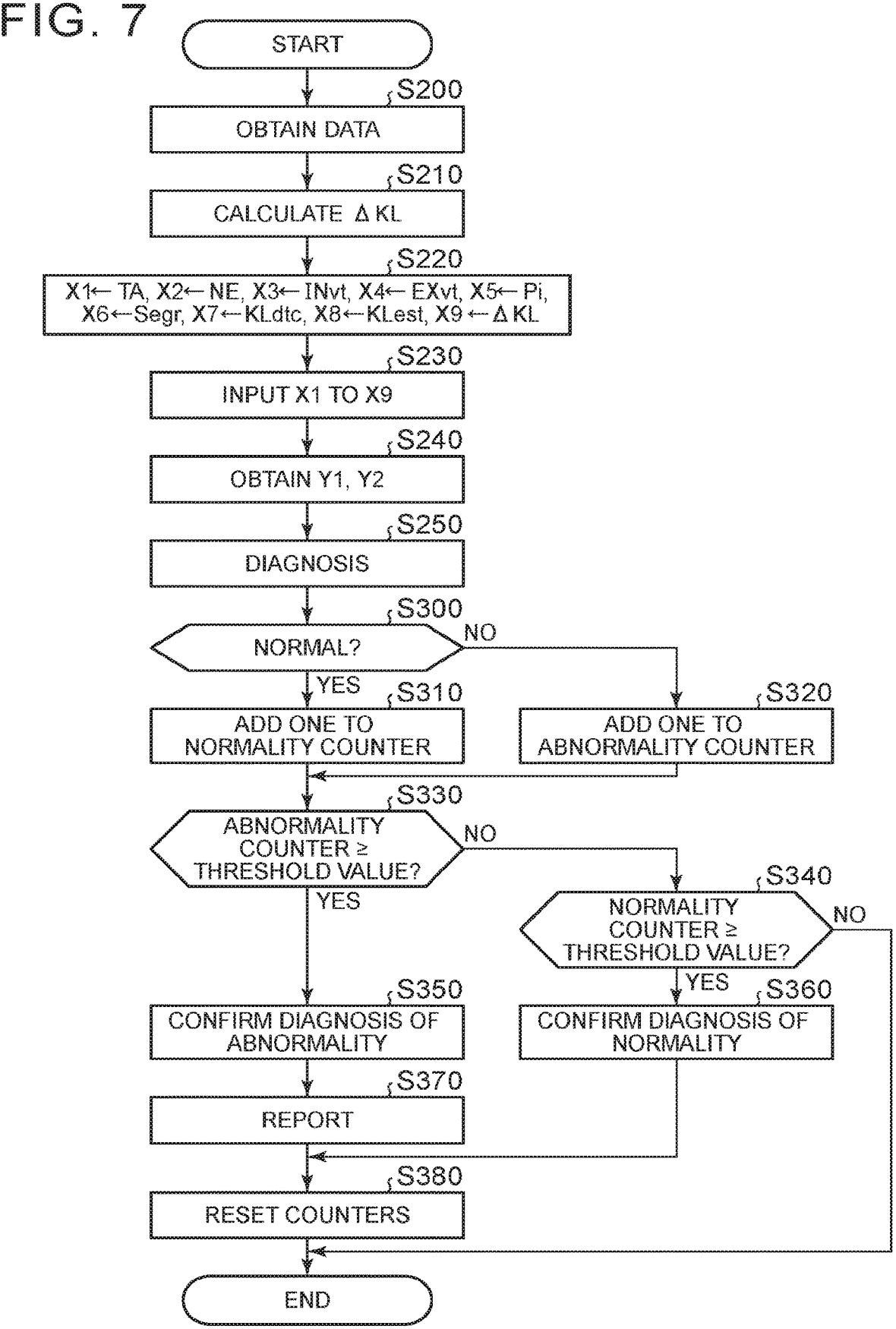
FIG. 7 is a flowchart illustrating the flow of a series of steps of the diagnostic process.

The neural network 76a thus generated is stored in the storage device 76 of the control system 70. Next, a routine representing a diagnostic process performed in the control system 70 will be described with reference to FIG. 7. The routine shown in FIG. 7 is repeatedly executed when the CPU 72 of the control system 70 executes an abnormality diagnosis program 74a stored in the ROM 74. This routine is executed under conditions that it is during one trip from the time when the main switch is turned ON to the time when it is turned OFF, and that a normality confirmation flag or an abnormality confirmation flag which will be described later is not set. The cycle of execution of the routine is several dozens of seconds to one to two minutes, for example.

When the routine of FIG. 7 is started, the CPU 72 initially obtains data, in step S200. More specifically, the CPU 72 obtains the throttle opening TA, engine speed NE, advance amount INvt, retard amount EXvt, supercharging pressure Pi, number of operation steps Segr, load detected value KLdtc, and load estimated value KLest, which provide the input values X1 to X8 of the neural network 76a.

Then, in step S210, the CPU 72 calculates a difference ΔKL between the previous calculation value and current calculation value of the load estimated value KLest calculated at regular intervals. The cycle of calculation of the load estimated value KLest is several milliseconds. Namely, in step S210, the CPU 72 calculates the difference ΔKL between the load estimated value KLest calculated at the time when this cycle of the routine is executed, and the load estimated value KLest calculated several milliseconds before. After the difference ΔKL, is calculated, the CPU 72 proceeds to step S220.

In step S220, the CPU 72 sets the values obtained through the tasks of step S200 and step S210, as the input values X1 to X9 of the neural network 76a. More specifically, the CPU 72 assigns the throttle opening TA to the input value X1, assigns the engine speed NE to the input value X2, assigns the advance amount INvt to the input value X3, assigns the retard amount EXvt to the input value X4, and assigns the supercharging pressure Pi to the input value X5. Also, the CPU 72 assigns the number of operation steps Segr to the input value X6, assigns the load detected value KLdtc to the input value X7, assigns the load estimated value KLest to the input value X8, and assigns the difference ΔKL to the input value X9.

Next, in step S230, the CPU 72 inputs the input values X1 to X9 to the neural network 76a. Then, in step S240, the CPU 72 obtains the output values Y1, Y2 calculated using the neural network 76a. Then, in step S250, the CPU 72 determines, based on the output values Y1, Y2, whether there is an abnormality in the air flow meter 80. More specifically, the CPU 72 determines that the air flow meter 80 is normal when the output value Y1 is larger than "0.5". On the other hand, the CPU 72 determines that there is an abnormality in the air flow meter 80, when the output value Y2 is larger than "0.5".

Then, the CPU 72 proceeds to step S300 to determine whether the result of diagnosis in step S250 indicates that the air flow meter 80 is normal. When the CPU 72 determines in step S300 that the diagnostic result indicates that the air flow meter 80 is normal (step S300: YES), the CPU 72 proceeds to step S310. Then, the CPU 72 adds one to a normality counter in step S310. The normality counter is a counter for counting the number of times the diagnosis made in step S250 indicates that the air flow meter 80 is normal. The normality counter is reset to "0" when the main switch 110 is turned OFF, and is "0" when the main switch 110 is turned ON. Thus, the control system 70 counts the number of times normality diagnoses are made during one trip, by using the normality counter.

On the other hand, when the CPU 72 determines in step S300 that the result of diagnosis indicates that there is an abnormality in the air flow meter 80 (step S300: NO), the CPU 72 proceeds to step S320. Then, the CPU 72 adds one to an abnormality counter in step S320. The abnormality counter is a counter for counting the number of times the diagnosis made in step S250 indicates that there is an abnormality in the air flow meter 80. The abnormality counter is reset to "0" when the main switch 110 is turned OFF, and is "0" when the main switch 110 is turned ON. Thus, the control system 70 counts the number of times abnormality diagnoses are made during one trip, by using the abnormality counter.

After completing the task of step S310 or step S320, the CPU 72 proceeds to step S330. In step S330, the CPU 72 determines whether the abnormality counter is equal to or larger than a threshold value. In the control system 70, the threshold value is, for example, "5". When the CPU 72 determines in step S330 that the abnormality counter is equal to or larger than the threshold value (step S330: YES), it proceeds to step S350. Then, the CPU 72 confirms the diagnosis of abnormality in step S350. More specifically, the CPU 72 confirms the diagnosis of the presence of an abnormality in the air flow meter 80, and sets the abnormality confirmation flag. The abnormality confirmation flag, when it is set, is information indicating that the diagnosis of the presence of an abnormality in the air flow meter 80 is confirmed. The abnormality confirmation flag is stored in the storage device 76, and is kept being set until it is cleared upon completion of repair of the air flow meter 80.

After completing the task of step S350, the CPU 72 proceeds to step S370, and performs reporting operation to report that there is an abnormality in the air flow meter 80, as coping operation. To implement the reporting operation, the CPU 72 executes a coping program 74b stored in the ROM 74. As shown in FIG. 1, a warning light 100 is connected to the control system 70. In the reporting operation, the CPU 72 turns on the warning light 100, so as to report that there is an abnormality in the air flow meter 80. Namely, in the control system 70, the CPU 72 performs the reporting operation to report that there is an abnormality in the air flow meter 80, when the abnormality confirmation flag is stored and set in the storage device 76.

On the other hand, when the CPU 72 determines in step S330 that the abnormality counter is smaller than the threshold value (step S330: NO), it proceeds to step S340. In step S340, the CPU 72 determines whether the normality counter is equal to or larger than a threshold value. In the control system 70, the threshold value is set to "5", as is the case in step S330.

When the CPU 72 determines in step S340 that the normality counter is equal to or larger than the threshold value (step S340: YES), it proceeds to step S360. Then, the CPU 72 confirms the diagnosis of normality in step S360. More specifically, the CPU 72 confirms the diagnosis indicating that the air flow meter 80 is normal, and sets the normality confirmation flag. The normality confirmation flag, when it is set, is information indicating that the diagnosis of normality of the air flow meter 80 is confirmed. The normality confirmation flag, which is stored in the storage device 76, is kept being set until the main switch is turned OFF, and is cleared when the main switch is turned OFF.

After executing step S360 or step S370, the CPU 72 proceeds to step S380. In step S380, the CPU 72 resets the counters. Namely, the CPU 72 resets the abnormality counter and the normality counter to "0". Then, the CPU 72 once finishes the routine.

On the other hand, when the CPU 72 determines, in step S340, that the normality counter is smaller than the threshold value (step S340: NO), the CPU 72 once finishes the routine, without executing step S350 to step S380.

Next, the operation of this embodiment will be described. The control system 70 repeatedly executes the routine of the diagnostic process shown in FIG. 7, under a condition that no conformation flag is set. Therefore, the diagnostic process is not carried out when the diagnosis of normality is confirmed, and the normality confirmation flag is set, or when the diagnosis of abnormality is confirmed, and the abnormality confirmation flag is set. Namely, the diagnostic process is repeated until either of the diagnosis confirmation flags is set.

Then, when the diagnosis of abnormality is made five times, and the diagnosis of abnormality is confirmed, the diagnostic process will not be performed, until repair is done and the abnormality confirmation flag is cleared. Also, when the diagnosis of normality is made five times, and the diagnosis of normality is confirmed, before the diagnosis of abnormality is confirmed, the diagnostic process will not be performed during the trip. Namely, when the diagnosis of normality is confirmed, the diagnostic process for this trip is finished.

The effects of this embodiment will be described. (1) When an abnormality occurs in the air flow meter 80, the load detected value KLdtc deviates from the load estimated value KLest. Thus, data including the load detected value KLdtc and the load estimated value KLest are effective as inputs of diagnosis as to whether there is an abnormality in the air flow meter 80. Also, the control system 70 inputs condition index values, in addition to the load detected value KLdtc and the load estimated value KLest. The condition index values provide information indicating conditions of the engine 10 when the load detected value KLdtc and the load estimated value KLest are calculated. Accordingly, the condition index values serve to verify the reliability of the load detected value KLdtc and the load estimated value KLest. The control system 70 as described above can make a diagnosis in view of the conditions of the engine 10 when the load detected value KLdtc and the load estimated value KLest are calculated. However, the degree of deviation between the load detected value KLdtc and the load estimated value KLest is different between the period of steady operation where the engine load is stable, and the period of transient operation where the engine load changes largely. Thus, the control system 70 further inputs the difference ΔKL as a change index value indicating the degree of change of the engine load. In this manner, it is possible to make a diagnosis while taking account of an influence of the degree of change of the engine load.

Namely, the control system 70 can conduct abnormality diagnosis of the air flow meter 80, without restricting the chances of execution to those under a condition that the air flow meter 80 outputs a stable detection signal. (2) The opening-closing timing of the intake valves 16 is an element that has an influence on the operating state of the engine 10. Thus, the control system 70 in which the operation amount of the intake-side variable valve timing device 44 is included in the inputs of the neural network 76a can make a diagnosis in view of the influence of the opening-closing timing of the intake valves 16.

(3) The opening-closing timing of the exhaust valves 26 is an element that has an influence on the operating state of the engine 10. Thus, the control system 70 in which the operation amount of the exhaust-side variable valve timing device 46 is included in the inputs of the neural network 76a can make a diagnosis in view of the influence of the opening-closing timing of the exhaust valves 26.

(4) The supercharging pressure Pi is an element that has an influence on the operating state of the engine 10. Thus, the control system 70 in which the supercharging pressure Pi is included in the inputs of the neural network 76a can make a diagnosis in view of the influence of the supercharging pressure Pi.

(5) In the case of the engine 10 in which exhaust gas is recirculated into the intake passage 12, the amount of the exhaust gas recirculated is an element that has an influence on the operating state of the engine 10. Thus, the control system 70 in which the number of operation steps Segr indicating the opening of the EGR valve 36 is included in the inputs of the neural network 76a can make a diagnosis in view of the influence of the exhaust gas recirculated into the intake passage 12.

(6) In the diagnostic process, when a diagnosis of the presence of an abnormality is made a predetermined number of times during one trip, the control system 70 confirms the diagnostic result indicating the presence of the abnormality, and stores the abnormality confirmation flag in the storage device 76. Therefore, it is possible to conduct diagnosis with higher accuracy, as compared with the case where the diagnostic result indicating the presence of an abnormality is confirmed based on the result of a single diagnosis. Then, it is possible to leave information used for confirming whether there is an abnormality. Consequently, it is possible to cope with the abnormality, through repair, for example, by checking the information stored in the storage device 76.

(7) In the diagnostic process, when the control system 70 determines a plurality of times that there is no abnormality, during one trip, before confirming the diagnostic result indicating the presence of an abnormality, the control system 70 confirms the diagnosis of normality of the air flow meter 80, and finishes the diagnostic process in the trip concerned. Thus, it is possible to prevent the diagnostic process from continuing to be repeated, even though the air flow meter 80 is normal. Also, the diagnosis of normality is confirmed, under a condition that the diagnosis of normality is made a plurality of times; therefore, it is possible to make a diagnosis with higher accuracy, as compared with the case where the diagnosis of normality is confirmed only based on the result of a single diagnosis.

(8) When the abnormality confirmation flag is stored in the storage device 76, the control system 70 performs reporting operation to report that there is an abnormality in the air flow meter 80. Thus, when the diagnosis of abnormality is confirmed, the presence of the abnormality is reported, so as to promote repair.

This embodiment may be modified as follows, and implemented. This embodiment and the following modified examples may be combined with each other unless they are technically inconsistent with each other, and implemented.

(1) The method of calculating the load estimated value KLest may be changed as appropriate. For example, the valve timing of the intake valves 16 and the exhaust valves 26, EGR rate, supercharging pressure Pi, etc. may be added as inputs, and the load estimated value KLest may be estimated in view of these inputs.

(2) While the difference ΔKL, of the load estimated value KLest is calculated, as the change index value of the load estimated value KLest, in the above embodiment, the change index value may be calculated by another method. For example, the change index value may be the rate of change of the load estimated value KLest per unit time.

(3) The condition index values input to the neural network are not limited to those indicated in the above embodiment. For example, in the case where the engine 10 does not include the intake-side variable valve timing device 44, there is no need to input the advance amount INvt. Similarly, where the engine 10 does not include the exhaust-side variable valve timing device 46, there is no need to input the retard amount EXvt. Where the engine 10 does not include the supercharger 14, there is no need to input the supercharging pressure Pi. Where the engine 10 does not include the EGR valve 36, there is no need to input the number of operation steps Segr. The index value of the amount of exhaust gas recirculated into the intake passage 12 is not limited to the number of operation steps Segr. The EGR rate as the ratio of exhaust gas to gas drawn into the combustion chambers 18 may be calculated, and the EGR rate may be used as the index value. Also, other index values indicating conditions of the engine 10 may be added to the condition index values.

(4) In the illustrated embodiment, when the diagnosis of abnormality is made the predetermined number of times, and the abnormality confirmation flag is set, the warning light 100 is operated as the reporting operation. However, the applicable embodiment is not limited to this. For example, the number of times the diagnosis of abnormality is made may not be counted, and the reporting operation may be immediately performed when a diagnosis of abnormality is made.

In the illustrated embodiment, the warning light 100 is operated, so as to report that there is an abnormality, through visual information. However, the applicable embodiment is not limited to this. For example, the presence of an abnormality may be reported through audio information, for example, by operating a speaker.

(5) The execution device is not limited to the one that includes the CPU 72 and the ROM 74, and executes software processing. For example, the execution device may include a dedicated hardware circuit (such as ASIC (application specific integrated circuit)) that performs hardware processing on at least a part of the tasks performed by software processing in the illustrated embodiment. Namely, the execution device may have any of the following configurations (a) to (c). (a) The execution device includes a processor that executes all of the above tasks according to a program, and a program storage device, such as ROM, which stores the program. (b) The execution device includes a processor that executes a part of the above tasks according to a program, a program storage device, and a dedicated hardware circuit that executes the remaining tasks. (c) The execution device includes a dedicated hardware circuit that executes all of the above tasks. In this connection, there may be two or more software execution devices including processors and program storage devices, and there may be two or more dedicated hardware circuits.

(6) In the illustrated embodiment, the storage device 76 that stores the neural network 76*a* and the ROM 74 that stores the abnormality diagnosis program 74*a* are separate storage devices. However, the applicable embodiment is not limited to this arrangement.

(7) In the illustrated embodiment, the fuel injection valve 20 that injects fuel into each combustion chamber 18 is illustrated by way of example, as a fuel injector. However, the applicable embodiment is not limited to this. For example, the fuel injector may be a port injection valve that injects fuel into the intake passage 12. Also, both the port injection valve and in-cylinder or direct injection valve may be provided, for example.

The engine 10 is not limited to the spark ignition type engine, but may be a compression ignition type engine using light oil, or the like, as fuel, for example. It is not essential that the engine 10 constitutes a drive system. For example, the control system may be installed on a so-called series hybrid vehicle in which the crankshaft 24 is mechanically coupled to a vehicle-mounted generator, and power transmission is cut off from the drive wheels 60.

(8) The vehicle is not limited to the one in which the engine 10 is only the device that generates vehicle propulsion force, but may be a series hybrid vehicle, for example. Other than the series hybrid vehicle, the vehicle may be a parallel hybrid vehicle, or a series-parallel hybrid vehicle.

What is claimed is:

1. An abnormality diagnosis system that makes a diagnosis of an abnormality in an air flow meter provided in an intake passage of a vehicle-mounted engine having a throttle valve, the abnormality diagnosis system comprising:
    a storage device configured to store a trained neural network that is trained by using training data to which information as to whether there is an abnormality in the air flow meter is given as a true label, the trained neural network receiving, as inputs, condition index values indicating conditions of the vehicle-mounted engine including an opening of the throttle valve and an engine speed as a rotational speed of an output shaft of the vehicle-mounted engine, a load detected value as an index value of an engine load calculated based on a detection signal of the air flow meter, a load estimated value as an index value of the engine load estimated based on the condition index values without using the detection signal of the air flow meter, and a change index value indicating a degree of change of the engine load; and
    an execution device configured to execute a diagnostic process to determine whether there is an abnormality in the air flow meter, using the trained neural network, which receives the condition index values, the load detected value, the load estimated value, and the change index value, as the inputs.

2. The abnormality diagnosis system according to claim 1, wherein:
    the vehicle-mounted engine includes an intake-side variable valve timing device that changes an opening-closing timing of an intake valve relative to a rotational phase of the output shaft; and
    the condition index values include an operation amount of the intake-side variable valve timing device.

3. The abnormality diagnosis system according to claim 1, wherein:
    the vehicle-mounted engine includes an exhaust-side variable valve timing device that changes an opening-closing timing of an exhaust valve relative to a rotational phase of the output shaft; and
    the condition index values include an operation amount of the exhaust-side variable valve timing device.

4. The abnormality diagnosis system according to claim 1, wherein:
    the vehicle-mounted engine includes a supercharger; and
    the condition index values include a supercharging pressure.

5. The abnormality diagnosis system according to claim 1, wherein:
    the vehicle-mounted engine includes an exhaust recirculation passage that connects an exhaust passage with the intake passage, and a regulating valve provided in the exhaust recirculation passage and configured to regulate an amount of exhaust gas recirculated into the intake passage; and
    the condition index values include an index value indicating an opening of the regulating valve.

6. The abnormality diagnosis system according to claim 1, wherein the change index value is an amount of change of the load estimated value per unit time.

7. The abnormality diagnosis system according to claim 1, wherein, when the execution device determines a predetermined number of times, in the diagnostic process, that there is an abnormality in the air flow meter, during one trip, the execution device confirms a diagnostic result indicating the presence of the abnormality in the air flow meter, and stores information indicating that the diagnostic result is confirmed, in the storage device.

8. The abnormality diagnosis system according to claim 7, wherein, when the execution device determines a predetermined number of times, in the diagnostic process, that there is no abnormality in the air flow meter, before a diagnostic result indicating the presence of an abnormality is confirmed, during one trip, the execution device confirms a diagnostic result indicating that the air flow meter is normal, and finishes the diagnostic process in the trip.

9. The abnormality diagnosis system according to claim 7, wherein, when the information indicating that the diagnostic result indicating the presence of the abnormality in the air flow meter is confirmed is stored in the storage device, the execution device executes reporting operation to report the presence of the abnormality in the air flow meter.

* * * * *